United States Patent
Kippel

(10) Patent No.: US 10,005,016 B2
(45) Date of Patent: Jun. 26, 2018

(54) HYDROPHOBIC FILTRATION OF TEMPERING AIR

(71) Applicant: General Electric Company, Schenectady, NY (US)

(72) Inventor: Bradly Aaron Kippel, Greenville, SC (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 364 days.

(21) Appl. No.: 14/980,772

(22) Filed: Dec. 28, 2015

(65) Prior Publication Data

US 2017/0182442 A1 Jun. 29, 2017

(51) Int. Cl.
*B01D 46/00* (2006.01)
*F02C 7/141* (2006.01)
(Continued)

(52) U.S. Cl.
CPC ....... *B01D 46/003* (2013.01); *B01D 46/0023* (2013.01); *B01D 46/0086* (2013.01); *B01D 46/444* (2013.01); *B01D 46/446* (2013.01); *B01D 53/864* (2013.01); *B01D 53/8609* (2013.01); *B01D 53/8625* (2013.01); *F01D 25/305* (2013.01); *F01N 3/2066* (2013.01); *F02C 3/04* (2013.01); *F02C 7/055* (2013.01);
(Continued)

(58) Field of Classification Search
CPC .............. B01D 46/003; B01D 46/0023; B01D 46/0086; B01D 46/444; B01D 46/446; B01D 53/8609; B01D 53/8625; B01D 53/864; F01D 25/305; F01N 3/2066; F02C 3/04; F02C 7/055; F02C 7/141; F05D 2220/32; F05D 2240/35; F05D 2260/20; F05D 2260/607; F05D 2260/608; F05D 2270/311; F05D 2300/51
See application file for complete search history.

(56) References Cited

U.S. PATENT DOCUMENTS 7,824,636 B1  11/2010  Kraemer et al.
8,167,980 B2   5/2012  Hiner et al.
(Continued)

OTHER PUBLICATIONS

Extended European Search Report and Opinion issued in connection with corresponding EP Application No. 16203701.4 dated Apr. 21, 2017.

*Primary Examiner* — Robert Clemente
(74) *Attorney, Agent, or Firm* — Fletcher Yoder P.C.

(57) ABSTRACT

A gas turbine system may include an exhaust gas processing system configured to process exhaust gas received from a gas turbine engine of the system. An exhaust path of the exhaust processing system is configured to flow the exhaust gas through the exhaust processing system. A tempering air system of the exhaust processing system is configured to introduce tempering air into the exhaust path to cool the exhaust gas. The tempering air system includes a tempering air pathway extending from an air inlet of the tempering air system to a tempering air outlet where tempering air is introduced from the tempering air system and into the exhaust path. A filter system of the tempering air system has a hydrophobic filter positioned along the tempering air pathway, the hydrophobic filter being configured to remove hygroscopic and deliquescent materials from the air flowing through the tempering air pathway.

20 Claims, 3 Drawing Sheets

(51) Int. Cl.
*B01D 46/44* (2006.01)
*B01D 53/86* (2006.01)
*F01N 3/20* (2006.01)
*F02C 3/04* (2006.01)
*F02C 7/055* (2006.01)
*F01D 25/30* (2006.01)

(52) U.S. Cl.
CPC .......... *F02C 7/141* (2013.01); *F05D 2220/32* (2013.01); *F05D 2240/35* (2013.01); *F05D 2260/20* (2013.01); *F05D 2260/607* (2013.01); *F05D 2260/608* (2013.01); *F05D 2270/311* (2013.01); *F05D 2300/51* (2013.01)

(56) References Cited

U.S. PATENT DOCUMENTS

| | | |
|---|---|---|
| 8,182,587 B2 | 5/2012 | Hiner et al. |
| 8,186,152 B2 | 5/2012 | Zhang et al. |
| 8,516,786 B2 | 8/2013 | Zhang et al. |
| 8,596,073 B2 | 12/2013 | Zhang |
| 2011/0036066 A1* | 2/2011 | Zhang ................. F01D 25/305 60/39.5 |
| 2011/0158876 A1 | 6/2011 | Buzanowski et al. |
| 2013/0174736 A1* | 7/2013 | Li ....................... B01D 53/228 96/10 |
| 2014/0157778 A1 | 6/2014 | Ponnuraj et al. |
| 2015/0000292 A1 | 1/2015 | Subramaniyan et al. |
| 2017/0001137 A1* | 1/2017 | Lans ................. B01D 46/0086 |

* cited by examiner

HYDROPHOBIC FILTRATION OF TEMPERING AIR

BACKGROUND OF THE INVENTION

The subject matter disclosed herein relates to turbine systems and, more specifically, to systems and methods for injecting cooling air into exhaust gas flow(s) produced by turbine systems.

Gas turbine systems typically include at least one gas turbine engine having a compressor, a combustor, and a turbine. The combustor is configured to combust a mixture of fuel and compressed air to generate hot combustion gases, which, in turn, drive blades of the turbine. Exhaust gas produced by the gas turbine engine may include certain byproducts, such as nitrogen oxides ($NO_x$), sulfur oxides ($SO_x$), carbon oxides ($CO_x$), and unburned hydrocarbons.

BRIEF DESCRIPTION OF THE INVENTION

In accordance with an embodiment, a gas turbine system may include an exhaust processing system fluidly coupled to an outlet of a turbine of a gas turbine engine, the exhaust processing system being configured to receive an exhaust gas having products of combustion generated by the gas turbine engine, and to process the exhaust gas before the exhaust gas exits the gas turbine system. An exhaust path of the exhaust processing system is configured to flow the exhaust gas through the exhaust processing system. A tempering air system of the exhaust processing system is configured to introduce tempering air into the exhaust path to cool the exhaust gas. The tempering air system includes a tempering air pathway extending from an air inlet of the tempering air system to a tempering air outlet where tempering air is introduced from the tempering air system and into the exhaust path. A filter system of the tempering air system has a hydrophobic filter positioned along the tempering air pathway, the hydrophobic filter being configured to remove hygroscopic and deliquescent materials from the air flowing through the tempering air pathway.

In accordance with another embodiment, a simple cycle gas turbine system includes a compressor configured to draw air into a compressor air inlet and to produce compressed air, a combustor configured to receive a flow of the compressed air and a flow of fuel, and to combust a mixture of the compressed air and fuel to produce combustion gases, a turbine drivingly coupled to the compressor through a shaft and configured to receive the combustion gases from the combustor, and to extract work from the combustion gases to power a load and the compressor via the shaft, and a duct configured to receive the combustion gases from the turbine as an exhaust gas, the duct having multiple sections, and wherein the duct is fluidly coupled to a stack configured to allow treated exhaust gas produced from the exhaust gas to exit the simple cycle gas turbine system. The duct houses a tempering air injection grid configured to introduce filtered tempering air into a flow of the exhaust gas through the duct, the tempering air outlet being fluidly coupled to a tempering air inlet via a tempering air pathway comprising a filter system having a hydrophobic filter configured to remove hygroscopic and deliquescent materials from air flowing through the tempering air pathway, wherein the filter system is configured to produce the filtered tempering air from air drawn in through the tempering air inlet.

In accordance with a further embodiment, a method of operating a simple cycle gas turbine system includes driving a load by extracting work from combustion gases to produce an exhaust gas using a gas turbine engine of the simple cycle gas turbine system, directing the exhaust gas into a duct fluidly coupled to the gas turbine engine, drawing air into one or more tempering air inlets of a tempering air pathway coupling the one or more tempering air inlets with a tempering air injection grid positioned in the duct, the air being drawn in as tempering air, filtering the tempering air within one or more filter systems respectively positioned proximate the one or more tempering air inlets to produce filtered tempering air by drawing the tempering air through at least a hydrophobic filter of the one or more filter systems to remove hygroscopic and deliquescent materials from the tempering air, directing the filtered tempering air to a tempering air injection grid positioned in a first section of the duct to inject the filtered tempering air into the first section, mixing the filtered tempering air with the exhaust gas within the first section of the duct to transfer heat from the exhaust gas to the filtered tempering air and thereby produce a cooled exhaust gas, and reacting the cooled exhaust gas with a reductant in the presence of a stationary catalyst of a selective catalytic reduction (SCR) system within a second section of the duct to reduce a concentration of nitrogen oxides (NOx) in the cooled exhaust gas to produce a treated exhaust gas.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

Figure 1:
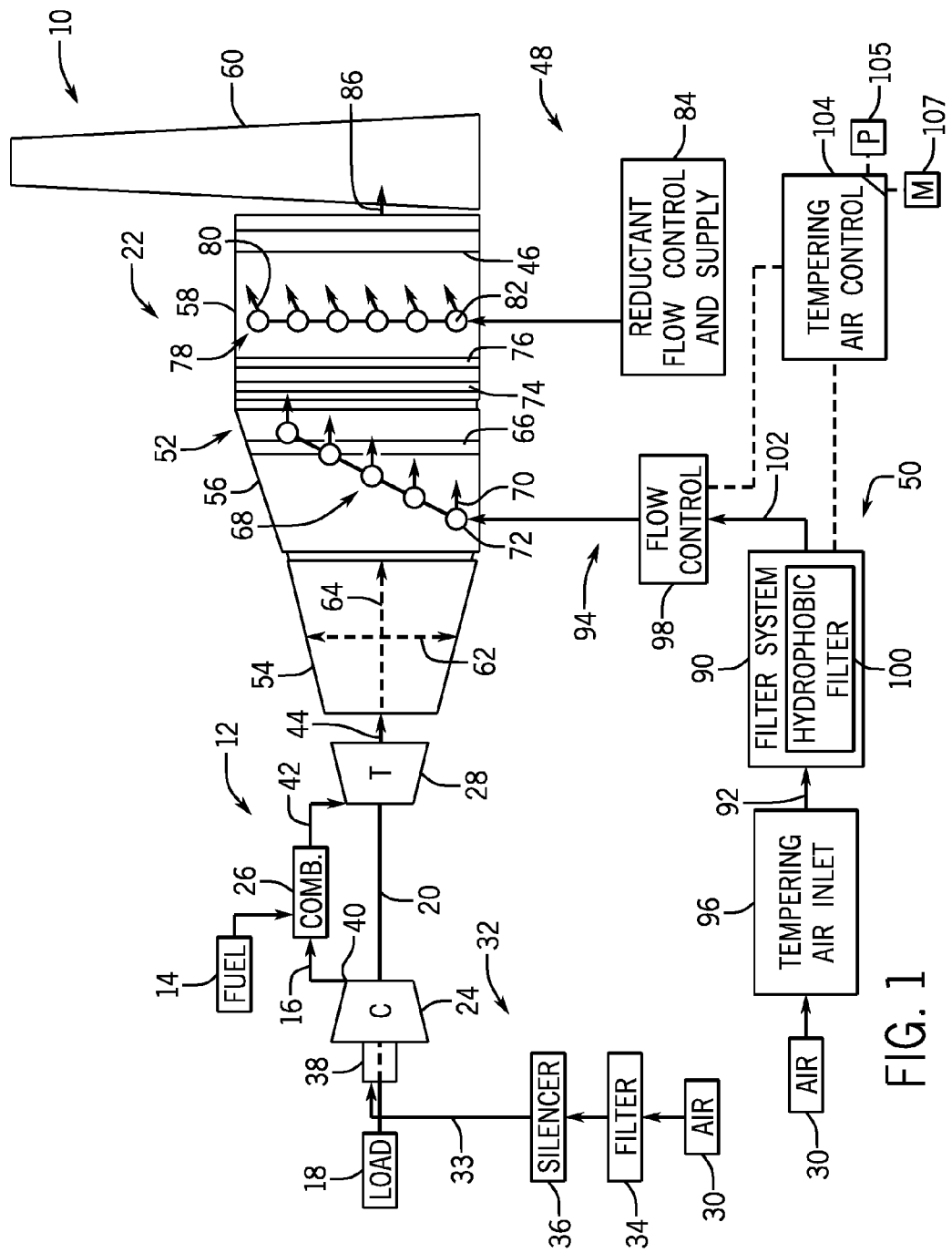
FIG. 1 illustrates a side elevational view of an embodiment of a simple cycle gas turbine system having a gas turbine engine, an exhaust processing system, and a tempering air system having a hydrophobic filter configured to filter tempering air, in accordance with an aspect of the present disclosure.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

As set forth above, it may be desirable to reduce the presence of certain products of combustion present within exhaust gas generated by a gas turbine engine. Such products may include nitrogen oxides ($NO_x$), sulfur oxides ($SO_x$), carbon oxides ($CO_x$), and unburned hydrocarbons. Generally, reducing the relative concentration of these products within an exhaust gas may include reacting such products with other reactants in the presence of a catalyst. The reaction between $NO_x$ and a reductant such as ammonia ($NH_3$), for example, may occur within an exhaust duct in the presence of a metal oxide catalyst of a selective catalytic reduction (SCR) system. The catalyst lowers the activation energy of a reaction between the $NO_x$ and ammonia to produce nitrogen gas ($N_2$) and water ($H_2O$), thereby reducing the amount of $NO_x$ in the exhaust gas before the exhaust gas is released from the gas turbine system.

SCR systems may be used in a variety of different gas turbine systems, which range from relatively small scale systems to larger, heavy-duty gas turbine systems. Small scale systems produce exhaust gases having a relatively low temperature, while heavy-duty gas turbine systems produce exhaust gases with much higher temperatures. While exhaust gases from small scale systems have a temperature range that is generally amenable to the SCR process, the temperature of exhaust gases produced by heavy-duty systems is often much higher than acceptable operating ranges for the SCR process (e.g., temperatures suitable to maintain stability of the SCR catalyst). For example, in accordance with an embodiment of the present disclosure, the isotherm temperature of exhaust gases produced by a heavy-duty gas turbine engine may be greater than about 1000° F. (e.g., about 540° C.), such as between about 1100° F. and about 1300° F. (e.g., about 590° C. and about 705° C.), while an acceptable operating range of a "hot" SCR system (an SCR system having a relatively higher operating temperature range compared to other SCR systems) may be between about 800° F. and about 900° F. (e.g., about 425° C. and about 485° C.).

To reduce a temperature of these hot exhaust gases to the acceptable operating range for the SCR system, the exhaust gases may be mixed with tempering air to transfer heat from the exhaust gas to the tempering air and thereby cool the exhaust gas. The amount of tempering air therefore determines the amount of heat removed from the exhaust gas.

It is now recognized that the amount of tempering air used to reduce exhaust gas temperature generated in heavy-duty systems is much larger than amounts used in other systems. For example, a flow volume of tempering air suitable to cool the exhaust gas in such systems to an appropriate temperature for the SCR system may represent between about 20% and about 50%, such as about 30%, of the exhaust flow volume. Accordingly, it is also now recognized that the composition of the tempering air, which has traditionally been ignored due to much lower relative flow volumes required to reduce lower temperature exhaust gases, may have a large impact on the operation of the gas turbine system and, in particular, the SCR catalyst.

For example, ambient air is typically used for a tempering air system. However, the ambient air in certain locations (e.g., coastal locations, industrial locations) may include certain contaminants, such as sea salt (sodium chloride) and other halide or metal halide-containing materials. These contaminants can have deleterious effects on the SCR catalyst and, in some instances, can alter (e.g., poison or foul) the catalyst. Thus, a need exists for tempering air that has relatively low concentrations of such contaminants, even in situations where the ambient air is drawn from locations where the ambient air has relatively high levels of catalyst poisons.

It is presently recognized that many of these catalyst poisons are hygroscopic and/or deliquescent materials and that while particulate filtration is acceptable for the removal of certain ambient air constituents, a hydrophobic filter may remove these catalyst poisons with higher efficiency. Thus, in accordance with an embodiment of the present disclosure, a tempering air system used to cool exhaust gas in a gas turbine system may utilize one or more hydrophobic filters to remove ambient air contaminants present as hygroscopic (water-absorbing), deliquescent (tending to absorb and dissolve in water), or deliquesced (absorbed and dissolved in water) materials.

While the present disclosure may be applicable to a number of different gas turbine systems, the embodiments described herein may be particularly useful in simple cycle heavy-duty gas turbine systems that produce relatively high temperature exhaust gases (e.g., greater than 1000° F., about 540° C.). One example of a system having a configuration in accordance with certain aspects of the present disclosure is depicted in FIG. 1, which is a side elevational view of an embodiment of a simple cycle gas turbine system 10.

In FIG. 1, the gas turbine system 10 includes a gas turbine engine 12 configured to combust a mixture of a fuel 14 and compressed oxidant 16 (e.g., compressed air) to in turn drive a load 18 such as an electrical generator configured to supply power to a grid. The illustrated gas turbine engine is drivingly coupled to the load 18 via a shaft 20, and is fluidly coupled to an exhaust processing system 22 configured to process products generated from the combustion of the fuel 14 and the compressed oxidant 16.

The gas turbine engine 12 includes various features to facilitate this combustion process, including a compressor 24, a combustor section 26, and a turbine 28. The turbine 28 may be drivingly coupled to the compressor 24 and the load 18 via the shaft 20. In operation, air 30 (an oxidant) from an air source (e.g., the ambient environment) enters the gas turbine engine 12 through an air intake system 32 including a pathway 33 configured to filter the air 30 (e.g., using a filter 34) and suppress noise associated with the influx of air into the air intake system 32 (e.g., using a silencer 36).

The air 30, having passed through the air intake system 32, flows along the pathway 33 to a compressor inlet 38, where air 30 is controllably drawn in to the compressor 24. For example, the compressor inlet 38 may include various features, such as inlet guide vanes, that are utilized and adjusted to vary the amount of air that can be drawn in to the compressor 24. The compressor 24 may include a plurality of compressor blades coupled to the shaft 20. The compressor blades may be present in one or more stages, and the rotation of the shaft 20 causes rotation of the compressor blades, which in turn produces compressed air (i.e., the compressed oxidant 16) having a pressure that is substantially higher than the pressure at the compressor inlet 38. This rotation also thereby causes a pressure difference across the compressor 24 that draws the air 30 into the compressor inlet 38. The compressed oxidant 16 is thereafter provided to from a compressor outlet 40 and to the combustor section 26.

The combustor section 26 may include one or more combustors. In certain embodiments, a plurality of combustors may be disposed at multiple circumferential positions in a generally circular or annular configuration about the shaft 20. As the compressed oxidant 16 exits the compressor 24 and enters the combustor section 26, the compressed oxidant 16 may be mixed with fuel 14 (from a fuel source) for combustion within the combustors.

By way of non-limiting example, the combustors may include one or more fuel nozzles that inject a fuel-air mixture into the combustors in a suitable ratio for combustion, emissions control, fuel consumption, power output, and so forth. The number and size of combustors, as well as the particular combustion parameters (e.g., fuel to air ratio, level of dilution) may all affect properties of combustion gases 42 (i.e., the products of combustion) produced from this combustion. For example, the relative ratio of the combustion products such as carbon oxides ($CO_x$) (e.g., carbon dioxide, carbon monoxide), nitrogen oxides ($NO_x$), sulfur oxides ($SO_x$), water, unburned oxidant and/or hydrocarbons, and so forth, may be affected by the combustion parameters, fuel-to-air ratios, and so forth.

The combustion gases 42 are utilized to drive one or more turbine stages (each having a plurality of turbine blades) within the turbine 28. In operation, the combustion gases 42 flowing into and through the turbine 28 flow against and between the turbine blades, thereby driving the turbine blades and, thus, the shaft 20 into rotation. The shaft 20 may then drive the load 18, such as an electrical generator in a power plant. As discussed above, the rotation of the shaft 20 also causes blades within the compressor 24 to draw in and pressurize the air 30 received at the compressor inlet 38 and the air intake system 32. In this way, work is extracted from the combustion gases 42 by the stages of the turbine, which progressively reduce a temperature and a pressure of the combustion gases 42 and release them as an exhaust gas 44. As noted above, in embodiments where the gas turbine engine 12 is a heavy-duty gas turbine engine, temperatures of the exhaust gas 44 may be, by way of non-limiting example, greater than about 1000° F. (e.g., about 540° C.), such as between about 1100° F. and about 1300° F. (e.g., about 590° C. and about 705° C.). The exhaust gas 44 is then provided to the exhaust processing system 22 for, among other things, treatment to reduce levels of certain products of combustion present within the exhaust gas 44.

As understood by those of ordinary skill in the art, a simple cycle gas turbine system, such as the system 10 shown in FIG. 1, may differ from a combined cycle system in that the combined cycle system may utilize the exhaust gas 44 generated by the gas turbine engine 12 to produce steam (e.g., using a heat recovery steam generator (HRSG)), which is in turn used to drive a steam turbine engine. Thus, in embodiments where the system 10 is, instead, a combined cycle system, the system 10 would also include features configured to produce steam (i.e., extract work) from the exhaust gas 44, which operates to further reduce a temperature and pressure of the exhaust gas 44. This may beneficially result in a temperature of the exhaust gas 44 that is suitable for treatment using a variety of catalysts.

On the other hand, in a simple cycle as shown in FIG. 1, no further extraction of work from the exhaust gas 44 generally occurs downstream of the turbine 28. However, levels of combustion by-products may still need to be reduced. To facilitate further processing of the exhaust gas 44 using, for example, a selective catalytic reduction (SCR) catalyst 46 of an SCR system 48, the exhaust gas 44 may be cooled using a tempering air system 50, which is described in further detail below.

To help illustrate the configuration and positioning of certain elements of the tempering air system 50, reference is made to various sections of the exhaust processing system 22, which may be continuous with one another, or may have a segmented configuration in which an outer wall of the sections are not continuous with one another. As illustrated, the exhaust gas 44 is provided from the turbine 28 and to the exhaust processing system 22, the depicted embodiment of which includes a duct 52 having (e.g., formed from) multiple sections. The duct 52 is illustrated by way of cross-section to facilitate discussion of certain features positioned within the duct 52. The multiple sections may include, but are not limited to, a diffusion section 54, a transition section 56, and an exhaust duct 58, and the exhaust gas 44 flows sequentially through these sections until the exhaust gas exits the system 10 via a stack 60.

The diffusion section 54 and the transition section 56, in a general sense, are configured to prepare the exhaust gas 44 for further treatment within the exhaust processing system 22. By way of non-limiting example, the diffusion section 54 may include various features such as airfoils, etc., configured to diffuse (or disperse) the exhaust gas 44 along one or more diffusion angles within the duct 52. The diffusion may be in a plurality of radial directions 62 relative to an axial direction 64 of the exhaust flow (e.g., substantially parallel with the shaft 20). In this way, a radial cross-section of a flow of the exhaust gas 44 taken at a downstream axial location of the diffusion section 54 is more disperse than a similar cross-section of the flow taken at an upstream axial location of the diffusion section 54.

In accordance with aspects of the present disclosure, the transition section 56 includes features configured to transition the exhaust gas 44 from a primarily laminar flow regime and into a more turbulent flow regime, and to cool the exhaust gas 44 (or begin cooling the exhaust gas 44 using a heat transfer fluid). By way of non-limiting example, the transition section 56 may include turbulators 66 such as turning vanes, perforated plates, and so forth, positioned adjacent to or interleaved with one or more tempering air injection features within the transition section 56.

The tempering air injection features may include, by way of example, a tempering air injection grid 68 configured to inject tempering air (depicted generally as arrows 70) via one or more perforated or open pipe air injection tubes 72. The tempering air injection grid 68 may constitute all or a part of a tempering air outlet of the tempering air system 50. As shown, the perforated air injection tubes 72 are positioned at different axial and radial positions (e.g., staggered positions) along the transition section 56. Such a configuration may facilitate mixing and heat transfer between increasingly turbulent exhaust gas and the injected tempering air 70. However, the positions of the air injection tubes 72 may have other, non-staggered configurations. Indeed, any suitable configuration of the air injection tubes 72 may be utilized in accordance with present embodiments.

A mixture of the injected tempering air 70 and the exhaust gas 44 is then directed to the exhaust duct 58, which may include additional turbulators 74 to encourage additional mixing and heat transfer between the injected tempering air 70 and the exhaust gas 44. A CO catalyst 76 may be positioned within the transition section 56. The CO catalyst 76 is generally configured to lower an activation energy of oxidation of certain carbonaceous species such as carbon monoxide and others. The CO catalyst 76 is generally selective for such carbonaceous species, and is less sensitive to high temperature exhaust gas than the SCR catalyst 46. In addition, the oxidation process may be exothermic.

While the CO catalyst 76 encourages oxidation of carbonaceous species in the exhaust gas 44, the SCR catalyst 46 facilitates chemical reduction of nitrogen oxides ($NO_x$) in the exhaust gas 44, as set forth above. To enable such reduction, the SCR system 48 is configured to introduce a reducing agent, such as ammonia ($NH_3$), using an ammonia injection grid (AIG) 78 positioned within the exhaust duct 58 downstream of the CO catalyst 76. The AIG 78 may include a manifold that distributes ammonia, depicted generally by arrows 80, among a plurality of ammonia injection outlets 82 for introduction into the exhaust gas 44. The AIG 78 is configured to distribute substantially the same amount of ammonia across the different ammonia injection outlets 82, and therefore across a radial cross-section of the exhaust duct 58 to encourage homogeneous mixing of the ammonia 80 and the exhaust gas 44.

A reductant flow control and supply system 84 may provide for receipt, storage, temperature control, and flow control of the ammonia (and/or other reducing agent). For example, the reductant flow control and supply system 84 may include one or more storage tanks configured to store the ammonia (e.g., as dry ammonia or as an aqueous ammonia/ammonium mixture), one or more evaporators configured to separate the ammonia from other materials (e.g., water), one or more heat exchangers or mixing conduits configured to control a temperature of the ammonia, and one more flow control devices (e.g., booster blowers, fans) configured to control a flow of the ammonia into the AIG 78.

The SCR catalyst 46 is positioned downstream of the AIG 78 and within the exhaust duct 58. The SCR catalyst 46 generally includes a catalyst that catalyzes a reaction between $NO_x$ and $NH_3$ to produce $N_2$ and $H_2O$. By way of non-limiting example, the SCR catalyst 46 may be implemented as a metal oxide (e.g., ceramic) coating over a honeycomb-like support structure. In such embodiments, the mixture of ammonia and the exhaust gas, having a temperature suitable for the SCR process primarily due to controlled cooling using the tempering air 70, flows over and through the coated honeycomb structure, which facilitates reduction of the $NO_x$ to produce a treated exhaust gas 86 that is released from the gas turbine system 10 via the stack 60.

Again, the exhaust gas 44 is cooled to a temperature appropriate for the SCR process primarily through the use of the tempering air 70. However, the duct 52 may not include features that are capable of removing deleterious materials from the air that is mixed with the exhaust gas 44, leaving the SCR catalyst 46 vulnerable to alteration (e.g., poisoning or fouling).

To prevent the influx of such materials into the duct 52, the tempering air system 50 includes a filter system 90 configured to remove hygroscopic, deliquescent, and deliquesced materials from tempering air 92 provided from a tempering air pathway 94 and to the tempering air injection grid 68. Specifically, the filter system 90 is positioned along the tempering air pathway 94 between a tempering air inlet 96 and flow control features (e.g., fans) 98. In other embodiments, the filter system 90 may be positioned downstream of the flow control features 98 (e.g., downstream of the fans). The flow control features 98 are configured to draw the ambient air 30 into the tempering air pathway 94 through the tempering air inlet 96 as tempering air and motivate the tempering air through the tempering air pathway 94 toward the tempering air injection grid 68. As depicted, the filter system 90 includes a hydrophobic filter 100 configured to remove certain materials that are hygroscopic, deliquescent, and deliquesced, from the tempering air. Thus, the filter system 90 prevents or resists water-soluble materials from passing through the tempering air pathway 94 that could otherwise foul the CO catalyst 76 or the SCR catalyst 46, or manifest as emissions from the stack 60. In this way, the filter system 90 produces filtered tempering air 102 for delivery to the tempering air injection grid 68, which thereby extends the life of at least the SCR catalyst 46 by preventing catalyst poisons from being introduced into the flow of the exhaust gas 44 via the tempering air.

A tempering air control system (TACS) 104 may regulate various operational aspects of the tempering air system 50. For example, the TACS 104 is communicatively coupled to a variety of components that facilitate regulation of flow rate, temperature, pressure, composition, and so forth. As depicted in FIG. 1, the TACS 104 communicates with sensing and/or control features associated with the filter system 90 and the flow control features 98.

The TACS 104 may be implemented on any suitable programmable architecture, such as an architecture including one or more processors 105 and one or more memory 107. Once programmed, the TACS 104 may be considered to constitute a specially-configured device that is configured to control specific aspects relating to the tempering air system 50 based at least on algorithmic structure associated with its programming. In this way, the TACS 104 may be configured to perform certain functions, and these functions should be considered to denote a specific algorithmic structure of the TACS 104 associated with the one or more processors 105 and one or more memory 107.

By way of non-limiting example, the TACS 104 may include one or more application specific integrated circuits (ASICs), one or more field programmable gate arrays (FPGAs), one or more general purpose processors, or any combination thereof. Additionally, the memory 107 storing instructions executed by processors 105 of the TACS 104 may include, but are not limited to, volatile memory, such as random access memory (RAM), and/or non-volatile memory, such as read-only memory (ROM), optical drives, hard disc drives, or solid-state drives. Further, the TACS 104 may be implemented as a part of a larger control system (e.g., a gas turbine control system), and/or as a variety of control devices and/or subsystems distributed throughout tempering air system 50 (e.g., a distributed control system). The control devices and/or subsystems, therefore, may include any one or a combination of the processing and memory circuitry configurations noted above. Additionally, the TACS 104 will generally include various input devices, and may include a user interface in the form of a display, or in the form of a connector that is accessible through wired or wireless connection with a computing device of the user.

Figure 2:
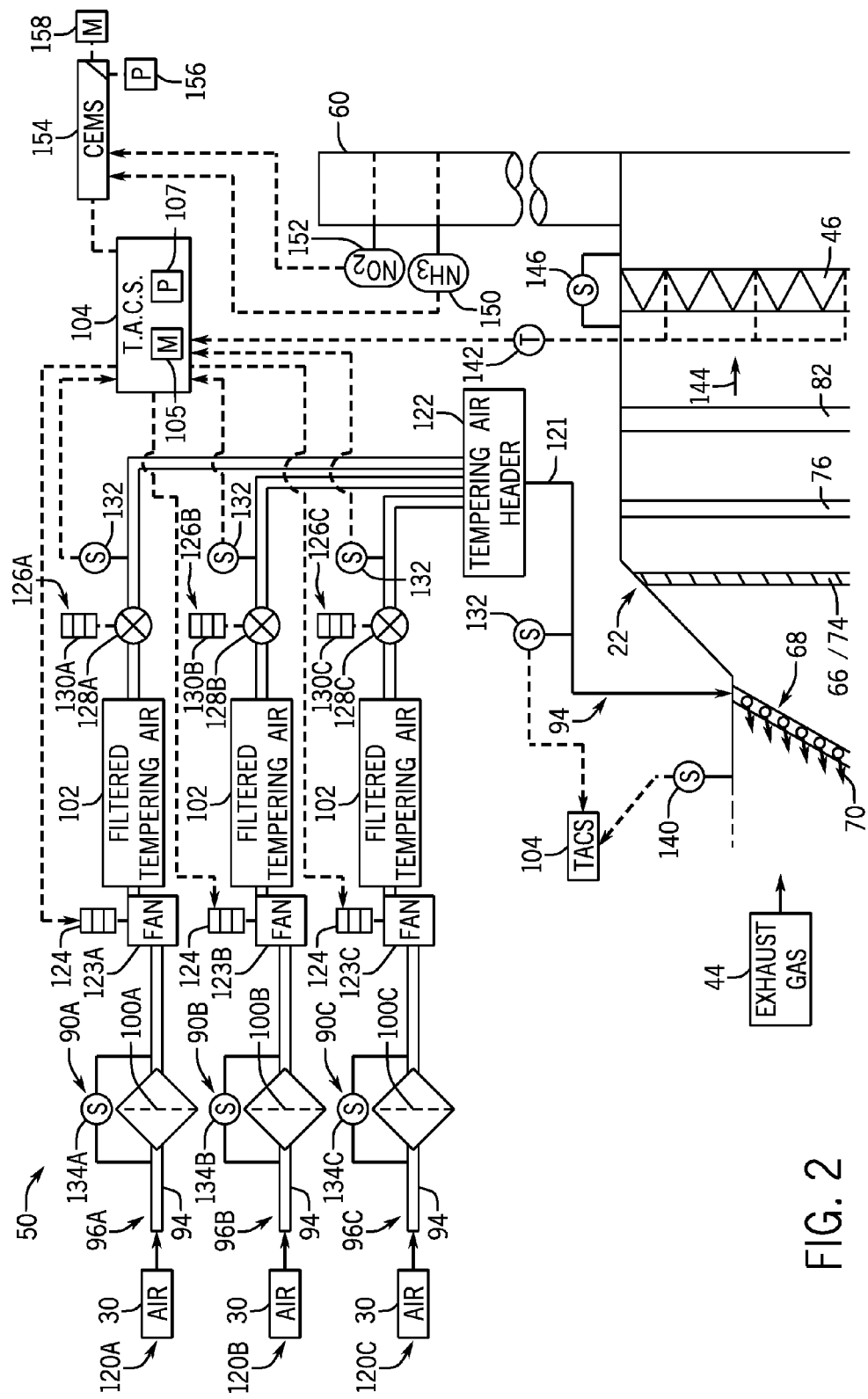
FIG. 2 illustrates a side elevational view of an embodiment of the tempering air system and the exhaust processing system of FIG. 1, the tempering air system having a plurality of parallel and independent flow paths, each path having a filter system with a respective hydrophobic filter, in accordance with an aspect of the present disclosure.

To help illustrate the manner in which various features of the tempering air system 50 may function to provide tempering air to the exhaust processing system 22, FIG. 2 is a diagrammatical partial view of the gas turbine system 10 including an embodiment of the tempering air pathway 94 having a plurality of parallel and independent flow paths 120. Specifically, the illustrated embodiment includes a first parallel and independent flow path 120A, a second parallel and independent flow path 120B, and a third parallel and independent flow path 120C, each of which extends from its respective air inlet 96 (first air inlet 96A, second air inlet 96B, and third air inlet 96C) to a tempering air header 122. While illustrated as including three such paths, any number (e.g., one or more) may be utilized. The tempering air header 122 is configured to combine filtered tempering air 102 provided from any combination of the parallel and independent flow paths 120, and to provide a combined flow (as an output 121 from the tempering air header 122) to the tempering air injection grid 68.

In certain embodiments, the tempering air header 122 may also include various flow control devices, heat exchangers, vents, and so forth.

While reference is made below to the parallel and independent flow paths 120 having different filter systems 90, it should be noted that the parallel and independent flow paths 120 may share all or a portion of one or more filter systems 90. For example, all or a subset of the parallel and independent flow paths 120 may share a filter house and/or one or more filtration stages of a single filter system 90. The configuration of the filter system 90 is described in further detail below with respect to FIG. 3.

Each of the parallel and independent flow paths 120 may have substantially the same configuration, or different configurations. As depicted, each parallel and independent flow path of the multiple parallel and independent flow paths includes an embodiment of the filter system 90 having an embodiment of the hydrophobic filter 100, and respective flow control features 98 (see FIG. 1) configured to control fluid flow into and through the tempering air pathway 94. For example, each of the illustrated flow paths 120 includes a respective fan 123 (illustrated as a first fan 123A, a second fan 123, and a third fan 123C) configured to draw the ambient air 30 into the tempering air pathway 94 as the tempering air 92 via the respective inlets 96A, 96B, 96C. Each respective fan 123 is also configured to draw the tempering air 92 through the corresponding filter system 90, including the hydrophobic filter 100, to produce the filtered tempering air 102. A respective actuator 124 associated with each fan 123 is configured to adjust operation of the fan 123 to adjust a pressure and/or flow rate of the filtered tempering air 102 through the corresponding parallel and intermediate flow path 120 to the tempering air header 122.

To enable further control over the flow of tempering air through the paths 120, each path 120 may also include a respective flow control device 126 (e.g., a flow control valve or damper 128 and associated actuator 130). For example, the fans 123 may be used for coarse flow control while the flow control devices 126 may be used for fine control. Additionally or alternatively, the flow control devices 126 may be configured as shutoff valves configured to close the corresponding parallel and independent flow path 120 and stop fluid flow in response to receiving a shutoff signal (e.g., from the TACS 104 or some other control device).

To provide for monitoring of the tempering air provided to the exhaust processing system 22, the tempering air system 50 may also include a variety of sensors 132 disposed along the tempering air pathway 94. In the illustrated embodiment of FIG. 2, one or more sensors 132 are positioned along the parallel and independent flow paths 120. For simplicity, only one sensor 132 is illustrated as being positioned on each flow path 120. However, the illustrated sensors 132 are intended to denote any one or a combination of sensors including one or more temperature sensors (e.g., thermocouples), flow meters, pressure sensors, water sensors, chemical analyzers (e.g., a gas chromatograph or similar separation and analysis device), or any combination thereof. Each sensor 132 may include, for example, a transducing device configured to measure a parameter of the tempering air and an indicating device configured to provide an external indication relating to a sensed parameter of the tempering air.

By way of non-limiting example, certain of the sensors 132 may be positioned downstream of the filter system 90 and downstream of the fan 123, which enables monitoring of the filtered tempering air 102 before provision to the tempering air header 122 and monitoring of the output from each parallel and independent flow path 120 on an individual basis. Monitoring downstream of the filter system 90 may also enable determinations relating to the efficiency of the filter system 90, such as its state of health, as well as correlations to estimated time-in-use or an estimated usable time remaining.

In accordance with certain aspects of the present disclosure, outputs of certain of the sensors 132 may be correlated by the TACS 104 to a state of the hydrophobic filters 100. For example, water or moisture sensors positioned both upstream and downstream of the filter systems 90 may provide an indication as to whether the hydrophobic filters 100 are operating properly by determining a level of water reduction in the filtered tempering air 102 relative to the ambient air 30. Similarly positioned chemical analyzers may provide an indication as to the level of reduction of certain alkali metal and/or halide-containing compounds by the hydrophobic filter 100 of the filter system 90.

Pressure and/or flow rate changes may be correlated to the operation or state of the filter system 90 and, in some embodiments, more specifically to portions of the filter system 90 such as the hydrophobic filter 100. As illustrated, the tempering air system 50 may include sensors 134 having tap-in points positioned upstream and downstream of the filter systems 90 to determine a pressure drop or change in flow rate of the tempering air across each respective filter system 90.

The sensors 132, 134 may be communicatively coupled to the TACS 104, which may execute various control routines in accordance with one or more sets of instructions (e.g., algorithms) programmed and stored onto the memory 107 and executed by the processors 105. The TACS 104 may include any suitable communication devices (e.g., input/output devices) configured to communicate with the sensors 132, 134 and to process inputs received from the sensors 132, 134 to generate inputs for control routines. For example, the sensors 132, 134 may have wired or wireless communication capabilities, and the TACS 104 may communicate with the sensors 132, 134 in accordance with appropriate protocols. The TACS 104 may perform (e.g., via calculation and/or by sending control outputs) certain diagnostic and control routines, for example. Indeed, in certain embodiments, the TACS 104 may correlate the pressure drop and/or change in flow rate to a state of the filter system 90, such as a state of the hydrophobic filter 100. The TACS 104 may also determine whether the hydrophobic filter 100 and/or the overall filter system 90 is operating within expected parameters based on various correlations between the outputs from the sensors 132, 134 and the specific configuration of the hydrophobic filter 100. Such determinations may also be performed using other inputs, as discussed below.

Additionally, in response to certain determinations based on inputs received from the sensors 132, 134, the TACS 104 may perform various control actions to adjust an operational parameter of the tempering air system 50. To provide for such control in the illustrated embodiment, the TACS 104 may be communicatively coupled to the actuators 124A, 124B, 124C of the fans 123A, 123B, 123C, respectively, to the actuators 130A, 130B, 130 C of the flow control devices 126A, 126B, 126C, respectively, or any combination thereof. In response to determining that a change in flow rate and/or pressure of tempering air along one of the respective pathways 120 may be appropriate, the TACS 104 may provide an output that affects the appropriate actuator or actuators (e.g., actuator 124 and/or actuator 130) to adjust operation of the fan 123 and/or valve 128. For example, the TACS 104 may send outputs to any one or a combination of the actuators 124, 130 to stop a flow of tempering air along one or more of the pathways 120 to keep one of the pathways on standby, or for maintenance. Similarly, the TACS 104 may send outputs to any one or a combination of the actuators 124, 130 to initiate flow along one of the pathways 120 to bring the pathway 120 online after being on standby or after maintenance (e.g., after maintenance on the filter system 90), for example. The TACS 104 may also adjust flow rates and/or pressures of the tempering air along the pathways 120 to account for variations in the amount of filtered tempering air 102 required to provide a desired amount of cooling to the exhaust gas 44. In other words, the TACS 104 may provide an output to actuate one or more of the fans 123 and/or flow control devices 126 to change a flow of the tempering air through the filter system 90 in response to determining that the state of the hydrophobic filter 100 is outside of a predetermined set of parameters. The TACS 104 may perform such control while also controlling introduction of the filtered tempering air 102 into the duct 52 to provide an amount of filtered tempering air 102 sufficient to cool the exhaust gas 44 to a temperature range corresponding to a catalytic temperature range associated with the SCR catalyst 46.

To that end, the TACS 104 may also monitor various aspects of the exhaust gas 44 before cooling with the tempering air, after cooling with the tempering air, and/or after treatment at the SCR catalyst 46 as a feed forward or feedback input. The TACS 104 may use the feed forward or feedback inputs in a control scheme configured to determine an appropriate flow (i.e., pressure and flow rate) of the tempering air header output 121.

To provide input relating to the exhaust gas 44 and to enable determinations relating to the filter system 90 (more specifically, to the hydrophobic filter), the illustrated exhaust processing system 22 includes a number of sensors positioned and configured to provide information to the TACS 104 relating to the exhaust gas 44 at various stages within the system 22. For example, the sensors may collectively or individually provide pressure, flow, temperature, and/or composition information relating to the exhaust gas 44. As an example and as illustrated, a first exhaust gas sensor 140 positioned upstream of the tempering air injection grid 68 may provide a first input relating to the exhaust gas 44 to the TACS 104. The first input may generally be any parameter, but in certain embodiments is related to flow parameters of the exhaust gas 44 and/or a temperature of the exhaust gas 44 before undergoing heat exchange with the tempering air 70. The TACS 104 may utilize this input, therefore, as a feed forward input for determining a flow and/or temperature of the tempering air 70 provided by the tempering air injection grid 68.

A second exhaust sensor 142 may be positioned and configured to monitor a temperature of a mixture of the exhaust gas 44, reducing agent 80, and tempering air 70 (depicted generally as arrow 144) downstream of the tempering air injection grid 68 but upstream of the SCR catalyst 46 (e.g., immediately upstream). The temperature input provided by the second exhaust sensor 142 may be important feedback for the TACS 104. For example, it will usually be desirable for the temperature of the mixture 144 to be within a temperature range that the SCR catalyst 46 is able to withstand for stable operation. Accordingly, if the temperature of the mixture 144 is outside of this range, the TACS 104 may determine that adjustments to the flow of the tempering air 70 provided via the tempering air injection grid 68 may be appropriate.

In accordance with present embodiments, the TACS 104 may be configured to utilize information from certain sensors within the exhaust processing system 22 to evaluate an effect of the tempering air on the SCR catalyst 46, and may in turn use this to control the manner in which the filter systems 90 are utilized. For example, as illustrated, a third exhaust sensor 146 may have tap-ins upstream and downstream of the SCR catalyst 46 to determine a change in pressure and/or flow rate of the exhaust gas across the catalyst 46. In situations where the change in pressure and/or flow rate is not within an expected or otherwise acceptable range, the TACS 104 may determine that the SCR catalyst 46 is not operating properly, or has undergone an amount of physical degradation that deleteriously affects pressure and/or flow. For example, the TACS 104 may utilize such feedback indicative of degradation of the SCR catalyst 46 as an indicator that one or more of the filter systems 90 may not be functioning to remove a desired amount of catalyst poisons from the tempering air 70 (see FIG. 1).

One or more sensors may also be configured to monitor a composition of the exhaust gas at one or more points downstream of the SCR catalyst 46 (e.g., within the stack 60). The TACS 104 may, in certain embodiments, use this feedback as an input to a tempering air control algorithm. For example, in the illustrated embodiment, the exhaust processing system 22 includes a $NO_x$ sensor 150 configured to measure a level of $NO_x$ in the exhaust gas discharged from the system 10 via the stack 60. The illustrated exhaust processing system 22 also includes an ammonia sensor 152 configured to measure unreacted ammonia in the exhaust gas discharged via the stack 60.

To provide for control over the relative concentration of these components in the exhaust gas in the stack 60 (i.e., the discharged exhaust gas), the exhaust processing system 22 may also include a continuous emissions monitoring system (CEMS) 154. The CEMS 154, as shown, is configured to receive feedback from the $NO_x$ sensor 150 and the ammonia sensor 152, and use this feedback to adjust ammonia injection or other aspects of the SCR system 48. To enable such control, the CEMS 154 may include associated processing devices 156 and memory devices 158. The CEMS 154 may include similar types of devices as set forth above with respect to the TACS 104, but may include different programming and, therefore, algorithmic structure. Further, the CEMS 154 and TACS 104 may be implemented together as modules (e.g., circuits or separate software applications) or similar portions of a larger control system, such as a control system that controls operation of most or all operational aspects of the gas turbine system 10.

As also illustrated, the CEMS 154 and the TACS 104 may be communicatively coupled to one another. The TACS 104 may use information obtained by the CEMS 154 as further input for tempering air flow control algorithms. For instance, the TACS 104 may adjust operation of one or more of the fans 123 and/or flow control devices 128 to adjust the flow.

Additionally or alternatively, the TACS 104 may utilize information from the CEMS 154 to determine a state of the filter systems 90 that are in use. For example, the CEMS 154 may determine that the SCR catalyst 46 is not operating within a predefined set of parameters (e.g., catalytic activity is not within a predetermined range). This determination may be made by routines performed in response to sensed NO$_x$ levels and/or ammonia levels in the discharged exhaust gas are out of a predetermined (e.g., acceptable) range. In response to determining that the SCR catalyst 46 is not operating as expected, the TACS 104 may in turn perform certain diagnostic routines to identify whether the filter systems 90, including the hydrophobic filters 100, are operating as expected. In situations where the filter systems 90 are not operating as expected, the TACS 104 may perform certain corrective actions, or may provide a user-perceivable indication that filter maintenance may be appropriate.

Figure 3:
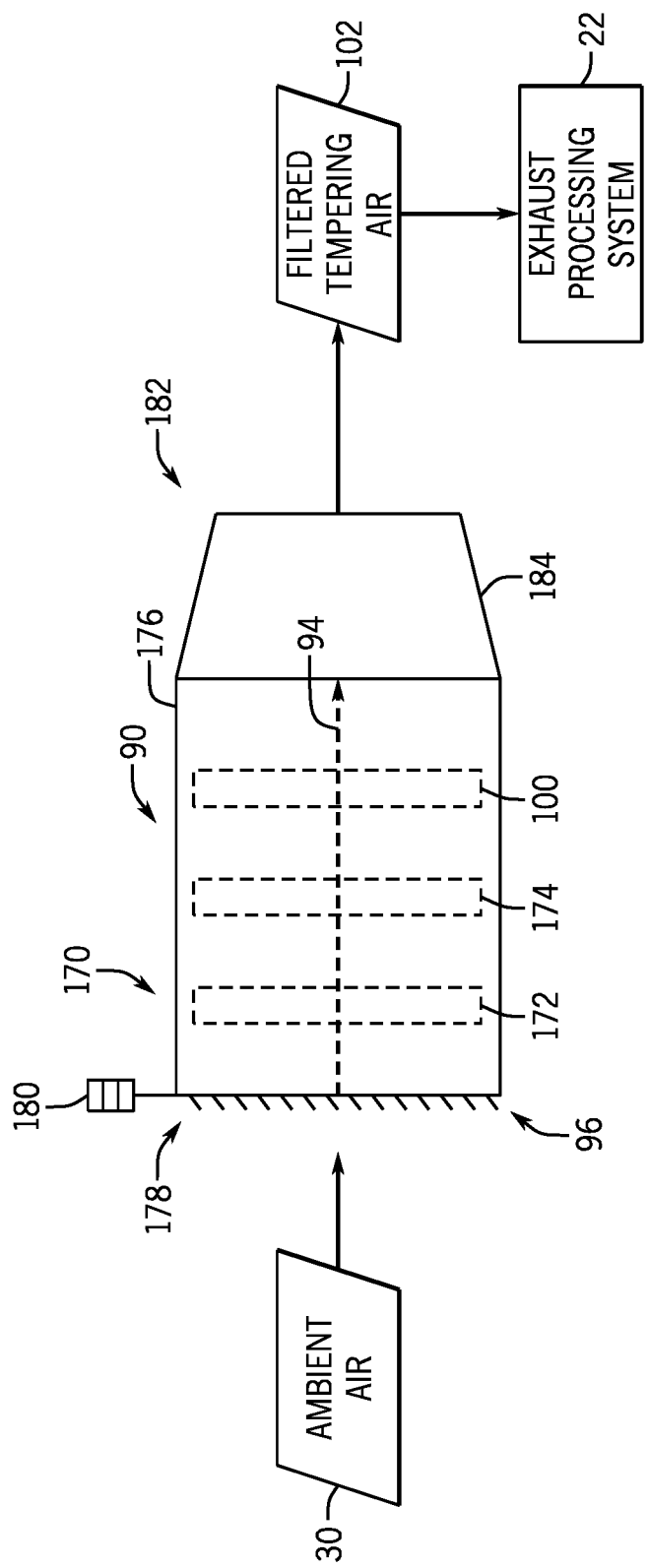
FIG. 3 illustrates a side view of an embodiment of the filter system of FIGS. 1 and 2 in which the filter system includes multiple filtration stages, the hydrophobic filter representing one of the filtration stages.

Operation of the filter system 90 may be further appreciated with reference to FIG. 3, which is an elevational side view of an embodiment of the filter system 90 having multiple filtration stages 170. As illustrated in FIG. 3, the filter system 90 includes three stages, but filter systems 90 configured in accordance with the present disclosure may include any number of stages including the hydrophobic filter 100 as a stage. In certain embodiments, only two stages may be used (e.g., the hydrophobic filter 100 as a stage, in addition to another stage such as dry or coarse particulate filtration). In still further embodiments, only the hydrophobic filter may be used to filter the ambient air 30 (drawn in as tempering air).

More specifically, the filter system 90 includes multiple filtration stages 170 such as a separator 172 (e.g., a water separator such as a vane separator), a prefilter 174, and the hydrophobic filter 100. In certain embodiments, the separator 172 may not be present. A filter house 176 covers and supports (e.g., houses) the multiple filtration stages 170, and in the illustrated embodiment includes the tempering air inlet 96. The filter house 176 may be in the form of a duct (plenum) configured to receive the ambient air 30 as the tempering air and to flow the tempering air along the tempering air pathway 94 through the multiple filter stages 170 to produce the filtered tempering air 102. The tempering air 102, as discussed above, is ultimately delivered to the exhaust processing system 22. In certain embodiments, the tempering air inlet 96 associated with the filter house 176 includes a plurality of covers or vanes 178 configured to enable covering (e.g., closing) of the tempering air inlet 96. In still further embodiments, the covers or vanes 178 may be movable (e.g., by an actuator 180) to adjust inlet flow. As a further example, the covers or vanes 178 may represent or include weather hoods positioned at the tempering air inlet 96 configured to resist ingress of rain water and similar environmental elements into the filter house 176.

Of the multiple filtration stages 170, the separator 172 may provide a first stage of water removal for the filter system 90, but in some embodiments may not be present. The separator 172 may include any suitable material capable of removing water from the tempering air by way of droplet nucleation. For example, the separator 172 may be configured to facilitate water droplet nucleation of aerosol droplets having a specific size range, and to remove gross water ingress. Water removal features (not shown) of the filter system 90 may remove sufficiently nucleated or coalesced water droplets from the filter system 90 (e.g., from a drain associated with the separator 172 and/or the hydrophobic filter 100).

The prefilter 174 is positioned between the separator 172 and the hydrophobic filter 100, and is configured to prolong the life of the hydrophobic filter 100 by, for example, filtering dry particles such as dust, dirt, and other coarse particles. The prefilter 174 may be considered to represent a second of the multiple stages 170 that removes a significant portion of large (e.g., coarse) particles before filtration by the hydrophobic filter 100. In other words, the prefilter 174 may be a size-based filter formed from any number of different materials (e.g., fiber, packing materials).

The hydrophobic filter 100, as shown, is disposed downstream of the prefilter 174. As set forth above, the hydrophobic filter 100 is configured to remove hygroscopic, deliquescent, and deliquesced materials from the tempering air. As an example, the hydrophobic filter 100 may include fiberglass coated with a suitably hydrophobic material, such as a fluoropolymer (e.g., PTFE), or may include an expanded PTFE membrane, or any combination of these or other suitable hydrophobic materials. In this regard, the hydrophobic filter 100 is configured to remove not only aqueous materials, but may also remove fine salt particles that would otherwise pass through a size-based filter. The hydrophobic filter 100 may encourage coalescence of water droplets, which may be removed by the water removal features (not shown) of the filter system 90. In certain embodiments, the hydrophobic filter 100 is capable of removing substantially all water droplets greater than 20 microns in size, and is capable of removing substantially all salt particles that are greater than 1 micron in size. In one embodiment, the removed salts and water may be taken off as salt water.

An outlet 182 of the filter system 90 (e.g., leading to a plenum of the tempering air pathway 94) may, in certain embodiments, include a transition section 184. The transition section 184 may have a frusto-conical geometry that facilitates flow toward various flow control devices of the tempering air pathway 94.

As set forth above, the TACS 104 may perform various monitoring and control schemes in conjunction with the filter system 90 (including, among others, the hydrophobic filter 100) to provide tempering air with desirably low levels of SCR catalyst poisons. The TACS 104 generally performs such monitoring and control schemes in conjunction with one another.

By way of example, one embodiment of a monitoring scheme may include monitoring of NO$_x$, and/or ammonia levels in the treated exhaust gas, either alone or in combination with exhaust flow information and tempering air flow information, as feedback relating to a state of the filter system 90 (e.g., its performance). Specifically, in certain embodiments, the TACS 104 may correlate (e.g., quantitatively attribute) feedback indicative of reduced catalytic efficiency by the SCR catalyst 46 with filtration efficiency of the hydrophobic filter 100. That is, because the hydrophobic filter 100 is configured to be the primary filter of catalyst poisons in the tempering air, indications of reduced catalytic activity in the presence of the tempering air may be specifically attributed to reduced efficiency of the hydrophobic filter 100. For example, in one embodiment, correlation of reduced catalytic activity to operational aspects of the hydrophobic filter may be done to the exclusion of other possible effectors, such as to the exclusion of reduced performance by other filtration stages. However, in other embodiments, this correlation may be made while considering other possible effectors.

In response to determining that the hydrophobic filter 100 of a particular pathway 120 (see FIG. 2) is not functioning properly, the TACS 104 may perform certain corrective actions and/or diagnostic routines. For example, the TACS 104 may perform corrective action by bringing an additional parallel and independent flow path 120 online. This may include opening the tempering air inlet 96 of an additional parallel and independent path 120, and drawing ambient air 30 into the path 120 through its associated hydrophobic filter 100. At substantially the same time, the TACS 104 may reduce or altogether stop tempering air flow through the hydrophobic filter 100 indicated as not functioning within its predetermined set of parameters. In other words, if the TACS 104 determines that the tempering air 70 from, for example, the first path 120A has unacceptably high levels of catalyst poisons, the TACS 104 may bring an additional flow path, such as the second path 120B or the third path 120C online, and may simultaneously reduce the flow rate of air through the first path 120A. By reducing the flow rate but bringing additional flows online, the cooling requirements of the exhaust gas 44 may still be met.

The TACS 104 may also perform other diagnostic routines in addition to or separate from those tied to the exhaust gas 44. For example, in response to determining that the first filter system 90A (specifically, its hydrophobic filter 100) may not be functioning properly, the TACS 104 may perform various tempering air flow adjustments through the first filter system 90A and may monitor how the tempering air flow is affected (e.g., by monitoring a profile of how the pressure and/or flow rate changes as the flow is adjusted). If the flow profile is not sufficiency similar to an expected flow profile, the TACS 104 may determine that the hydrophobic filter 100 may be blocked or is otherwise in need of maintenance. The TACS 104 may provide a user-perceivable indication (e.g., via a user interface) to this effect.

Technical effects of the invention include, but are not limited to improved filtering of tempering air that is injected into an exhaust gas. The improved filtering may reduce relative levels of certain SCR catalyst poisons present within the tempering air, thereby improving the operational life of the SCR catalyst and associated removal of $NO_x$ from the exhaust gas.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A gas turbine system, comprising:
an exhaust processing system fluidly coupled to an outlet of a turbine of a gas turbine engine, the exhaust processing system being configured to receive an exhaust gas having products of combustion generated by the gas turbine engine, and to process the exhaust gas before the exhaust gas exits the gas turbine system;
an exhaust path of the exhaust processing system configured to flow the exhaust gas through the exhaust processing system;
a tempering air system of the exhaust processing system configured to introduce tempering air into the exhaust path to cool the exhaust gas, wherein the tempering air system comprises a tempering air pathway extending from an air inlet of the tempering air system to a tempering air outlet where tempering air is introduced from the tempering air system and into the exhaust path; and
a filter system of the tempering air system having a hydrophobic filter positioned along the tempering air pathway, the hydrophobic filter being configured to remove hygroscopic and deliquescent materials from the air flowing through the tempering air pathway.

2. The system of claim 1, comprising a selective catalytic reduction (SCR) system of the exhaust processing system configured to reduce a concentration of nitrogen oxides ($NO_x$) in the exhaust gas, wherein the SCR system comprises a stationary catalyst positioned along the exhaust path and configured to catalyze a reaction between the $NO_x$, in the exhaust gas and a reductant, and wherein the tempering air outlet is positioned to introduce the tempering air into the exhaust path upstream of the stationary catalyst.

3. The system of claim 2, wherein the hydrophobic filter is configured to remove hygroscopic and deliquescent materials from the air flowing through the tempering air pathway that would otherwise alter active sites of the stationary catalyst.

4. The system of claim 1, wherein the tempering air pathway is entirely separate from an air pathway configured to flow air to a compressor of the gas turbine engine.

5. The system of claim 4, wherein the filter system is contained in a filter housing, and the system comprises an additional filter system contained in an additional filter housing positioned along the air pathway configured to flow air to the compressor of the gas turbine engine.

6. The system of claim 1, comprising one or more sensors configured to monitor a pressure drop of the air across the filter system of the tempering air system, or a change in flow rate of the air across the filter system, or both, and to provide an external indication relating to the pressure drop or the change in flow rate, or both.

7. The system of claim 6, comprising a tempering air control system having one or more processors and memory circuitry storing one or more sets of instructions that, when executed by the one or more processors, are configured to:
receive the external indication relating to the pressure drop of the air across the filter system or the change in flow rate of the air across the filter system, or both;
correlate the pressure drop or the change in flow rate to a state of the hydrophobic filter;
provide a user-perceivable indication, via a user interface, relating to the state of the hydrophobic filter.

8. The system of claim 7, wherein the one or more sets of instructions, when executed by the one or more processors, are configured to estimate a time-in-use of the hydrophobic filter, or a remaining time of useful life of the hydrophobic filter, or a combination thereof.

9. The system of claim 1, wherein the tempering air pathway comprises a plurality of air inlets including the air inlet, wherein the plurality of air inlets are configured to allow air to enter the tempering air pathway along parallel and independent flow paths leading to a tempering air header, and wherein the parallel and independent flow paths each include:
a respective filter system having a respective hydrophobic filter;
a respective fan positioned downstream of the respective filter system and configured to draw air into the respective air inlet and through the respective filter system, and to motivate the air through the respective parallel and independent flow path;
one or more respective sensors configured to detect a pressure drop across the respective filter system, a change in flow rate across the filter system, or both, and to provide an external indication relating to the pressure drop or the change in flow rate, or both; and
a respective air outlet leading to the tempering air header.

10. The system of claim 9, wherein the tempering air header is configured to combine respective flows of air from the plurality of parallel and independent flow paths, and to direct the respective flows of air to the tempering air outlet where tempering air is introduced from the tempering air system and into the exhaust path.

11. The system of claim 9, comprising a tempering air control system communicatively coupled to the one or more respective sensors and a respective actuator of the respective fan of the plurality of parallel and independent flow paths, the tempering air control system having one or more processors and memory circuitry storing one or more sets of instructions that, when executed by the one or more processors, are configured to:
  receive the external indication relating to the pressure drop of the air across the respective filter system or the change in flow rate of the air across the respective filter system, or both;
  correlate the pressure drop or the change in flow rate to a state of the respective hydrophobic filter;
  provide an output to the respective actuator of at least one of the respective fan to adjust a flow of air along the respective parallel and independent flow path in response to determining that the state of the respective hydrophobic filter is such that the respective hydrophobic filter is not operating within a predetermined set of parameters.

12. The system of claim 1, wherein the filter system is positioned at the air inlet and upstream of a fan configured to draw air into the air inlet and through the filter system, and to motivate the air through the tempering air pathway.

13. The system of claim 1, wherein the filter system comprises a multi-stage filter module having the hydrophobic filter as one of multiple filtration stages.

14. The system of claim 13, wherein the multi-stage filter module includes a prefilter configured to filter dry particles present within the air flowing through the tempering air pathway, and wherein the hydrophobic filter is positioned downstream of the particulate filter within the multi-stage filter module.

15. The system of claim 1, wherein the hydrophobic filter includes a fluoropolymer-coated fiberglass filter medium, or an expanded polytetrafluoroethylene (ePTFE).

16. A simple cycle gas turbine system, comprising:
  a compressor configured to draw air into a compressor air inlet and to produce compressed air;
  a combustor configured to receive a flow of the compressed air and a flow of fuel, and to combust a mixture of the compressed air and fuel to produce combustion gases;
  a turbine drivingly coupled to the compressor through a shaft and configured to receive the combustion gases from the combustor, and to extract work from the combustion gases to power a load and the compressor via the shaft; and
  a duct configured to receive the combustion gases from the turbine as an exhaust gas, the duct having multiple sections, and wherein the duct is fluidly coupled to a stack configured to allow treated exhaust gas produced from the exhaust gas to exit the simple cycle gas turbine system; and
  wherein the duct houses a tempering air injection grid configured to introduce filtered tempering air into a flow of the exhaust gas through the duct, the tempering air outlet being fluidly coupled to a tempering air inlet via a tempering air pathway comprising a filter system having a hydrophobic filter configured to remove hygroscopic and deliquescent materials from air flowing through the tempering air pathway, wherein the filter system is configured to produce the filtered tempering air from air drawn in through the tempering air inlet.

17. The system of claim 16, wherein the multiple sections of the duct include a diffusion section, a transition section downstream of the diffusion section, and an exhaust duct downstream of the diffusion section, the exhaust duct housing a stationary catalyst of a selective catalytic reduction (SCR) system configured to catalyze a reaction between nitrogen oxides ($NO_x$) in the exhaust gas and a reductant, and wherein the tempering air injection grid is positioned to introduce the filtered tempering air into the diffusion section or the transition section.

18. The system of claim 17, comprising a tempering air control system implemented by one or more processors and memory circuitry storing one or more sets of instructions that, when executed by the processor, are configured to:
  receive an external indication relating to a pressure drop of tempering air across the filter system or a change in a flow rate of the tempering air across the filter system, or both;
  correlate the pressure drop or the change in flow rate to a state of the hydrophobic filter;
  provide an output to actuate a flow control device to change a flow of the tempering air through the filter system in response to determining that the state of the hydrophobic filter is outside of a predetermined set of parameters, while also controlling introduction of the filtered tempering air into the duct to provide an amount of filtered tempering air sufficient to cool the exhaust gas to a temperature range corresponding to a catalytic temperature range associated with the stationary catalyst of the SCR system.

19. The system of claim 18, wherein the one or more sets of instructions that, when executed by the processor, are configured to control introduction of the filtered tempering air into the duct to provide an amount of filtered tempering air sufficient to cool the exhaust gas to a temperature range corresponding to the catalytic temperature range associated with the stationary catalyst of the SCR system by controlling respective flows of tempering air along a plurality of independent and parallel flow paths of the tempering air pathway.

20. The system of claim 16, wherein the filter system is contained in a filter housing positioned at an inlet of the tempering air pathway.

* * * * *